United States Patent Office 3,286,935
Patented Nov. 22, 1966

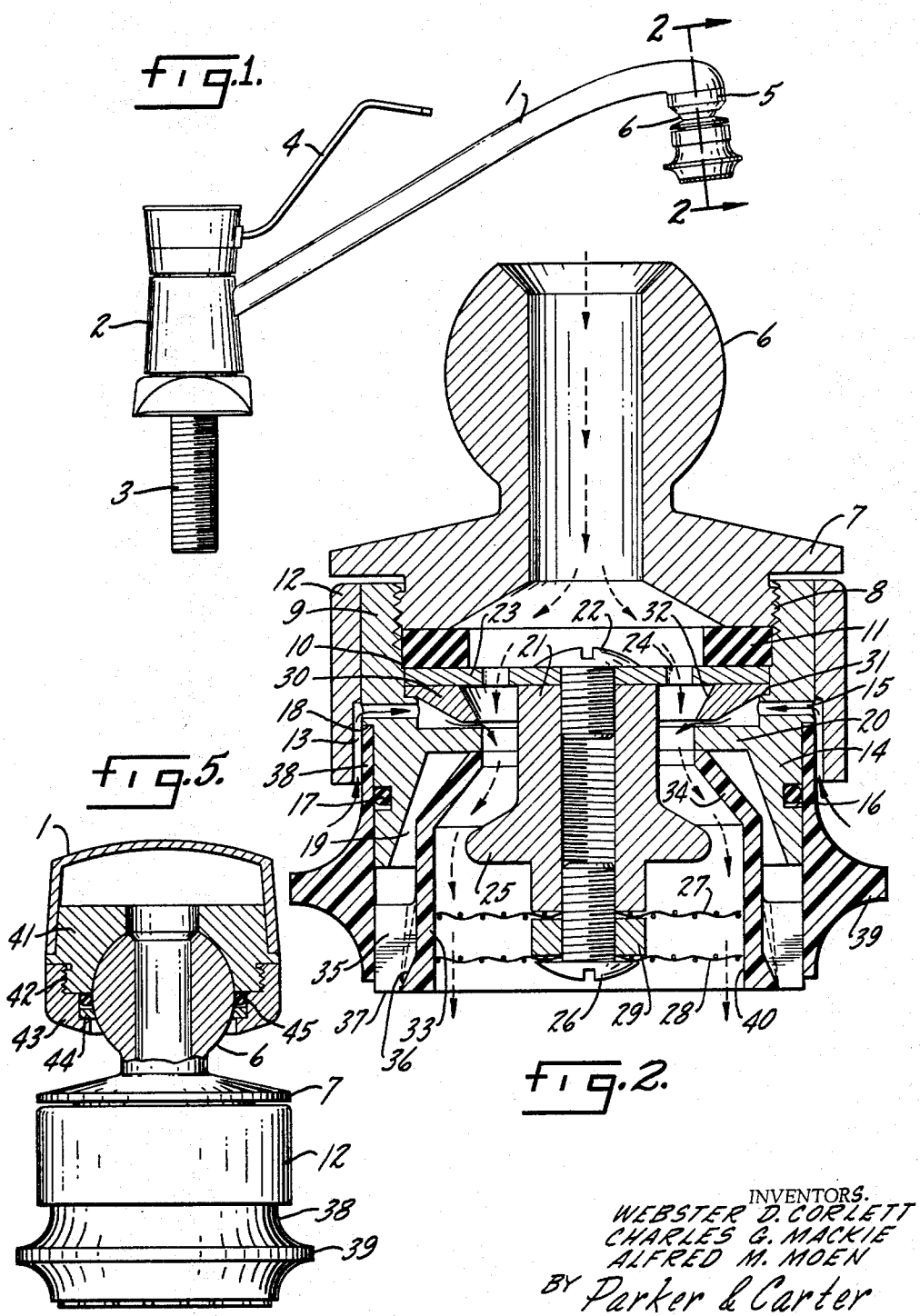

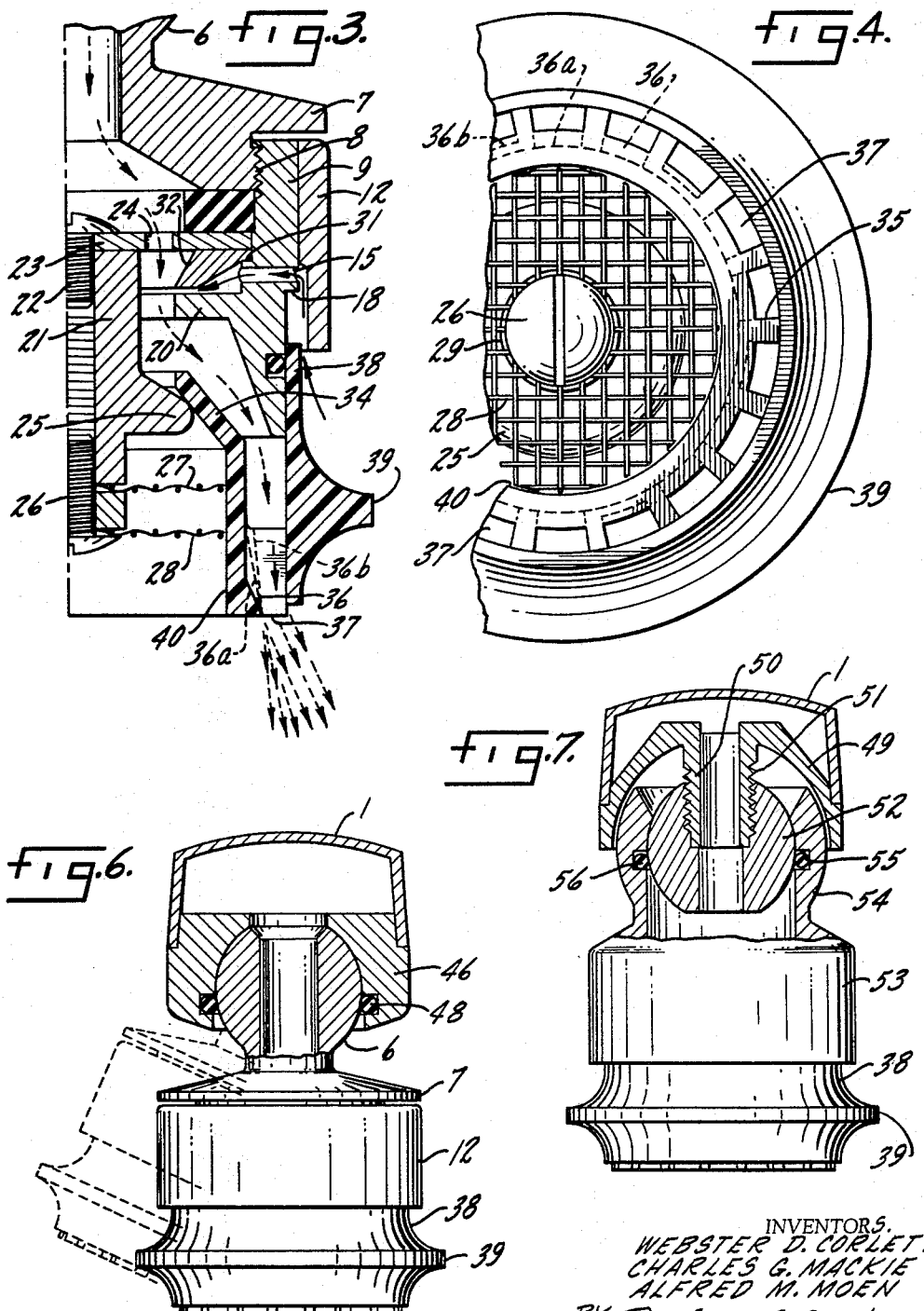

3,286,935
COMBINED LIQUID SPRAY AND AERATOR
Webster D. Corlett, River Forest, and Charles G. Mackie, Glen Ellyn, Ill., and Alfred M. Moen, Grafton, Ohio, assignors to Standard Screw Company, Bellwood, Ill., a corporation of New Jersey
Filed Feb. 8, 1965, Ser. No. 430,893
15 Claims. (Cl. 239—428.5)

This invention relates to a combined liquid spray and aerator.

It has for one object to provide a device from which water may be discharged as a spray or as a jet or solid stream selectively.

Another object is to provide a device of the type indicated in which an aerator is built into the spray-forming mechanism so that the spray and the aerator are, in effect, a unit.

Another object is to make such a device comprising a combined spray and aerator in which the aerator is effective whether the liquid is being discharged as a spray or as a solid stream or jet. When such a device is used in a sink it is advantageous at all stages of use and adjustment to provide an aerated discharge of water. Such aerated water, whether in the form of a spray or a solid stream or jet, tends to wet surfaces upon which it falls more rapidly than an unaerated stream of water. The aeration also helps to eliminate splash.

A further object is to provide means for protecting the aerator in such a device to prevent the entrance of dirt or foreign matter into the device and thus to protect the stream of water from pollution by foreign matter as the stream moves through the spray.

Another object is to provide in such a device, generally described, an adjustable means whereby the device may be adjusted at will to discharge a stream of water either as a solid stream or as a stream broken up in the form of a spray in distinction to a stream discharged relatively solidly as a jet or comparable compacted stream of water.

Other objects will appear from time to time throughout the specification and claims.

The invention is illustrated more or less diagrammatically in the accompanying drawings wherein:

FIGURE 1 is a side elevation of one form of the device;

FIGURE 2 is a longitudinal section taken on an enlarged scale at line 2—2 of FIGURE 1, with parts omitted;

FIGURE 3 is a fragmentary longitudinal cross-section of a portion of FIGURE 2 showing the parts in the position of adjustment for the discharge of water in the form of a spray;

FIGURE 4 is a bottom view of the spray mechanism of FIGURES 1 and 2 looking into the discharge opening;

FIGURE 5 is a sectional view of parts in elevation showing on a modified scale one form of swivel joint;

FIGURE 6 is a view generally similar to FIGURE 5 illustrating a further modification of the swivel joint with the parts shown in adjusted position in dotted lines; and FIGURE 7 is a further modified form of swivel joint.

In the particular form here shown, the device of this invention is applied to a single handle mixing faucet of the type suitable for use in kitchen sinks and in comparable situations. It may, of course, be applied to any faucet and its use therefore is not limited to the particular association shown. Also, it need not be applied to a single handle mixing faucet nor to a mixing faucet of any type. For some purposes such a device is equally useful on a faucet dealing with a single fluid which it is desired to project in aerated condition, solid or in the form of a spray. So much of the faucet as is illustrated and described is, therefore, merely illustrative of one particular form of a device with which the spray aerator of this invention may be used.

As shown, 1 is a faucet spout. It is connected to a faucet body 2 through which liquid flows from a pipe or connection 3. A handle 4 controls the valve positioned within the housing 2 for opening and closing of the water passage through the faucet. The faucet itself and the details of the valve are not shown as they form no particular part of the invention and it is sufficient that means be provided for supplying liquid through a faucet mechanism and for controlling the flow of the liquid through the faucet.

The spout 1 has secured to it a head member 5 which receives the ball 6 of the ball swivel joint to which the spray aerator is attached. The ball swivel joint may conveniently be enlarged as at 7 to provide a flange which overhangs all or much of the housing within which the spray aerator is contained. An exteriorly threaded portion 8 is integral with the portion 7 and receives the spray aerator.

While the spray aerator may be made of many materials, such as metal of different types, it is convenient to make it of plastic. It has been discovered that the plastics, of which several are available for this use, resist corrosion and resist the deposit of chemicals from the water, and hence, resist clogging, and a spray or an aerator will be less likely to clog for any reason if it is made of a plastic than if it is made of a metal. The details of the invention could, however, be equally well embodied in a device made of almost any material and, as a matter of convenience, they may be embodied as here shown in a device made partly of plastic and partly of metal.

The internally threaded ring 9 is engaged with the threaded portion 8 and is formed to provide a shoulder 10 against which a gasket of rubber or comparable material 11 is positioned. A shroud 12 is secured to the ring 9 and forms, in effect, an integral portion of it.

An annular passage 13 is positioned inside of the shroud 12 and provides space through which air may reach the interior of the device. The ring 9 is provided with a downward extension 14 which is integral with it and through which a plurality of air passages 15 is formed. The extension 14 is also externally grooved as at 16 to receive an O-ring 17. A shoulder 18 is formed on the exterior of the extension 14 for a purpose which will be described below.

The interior of the extension 14 is downwardly converged to form a downwardly converging water passage as at 19 and the extension is provided with an inwardly directed flange 20.

A central plug-like member 21 is formed in the interior of the spray aerator and receives a screw 22 which holds in place a perforated disk 23 provided with perforations 24. The rubber gasket 11 is seated against the upper surface of the disk 23 and the disk is held in place by the screw 22. A more or less hemispherical enlargement 25 is formed on the member 21. A screw 26 is seated in the lower end of the member 21 and holds in place a pair of screens 27 and 28 which are themselves separated by a spacing member 29.

A venturi shield 30 is positioned upon a shoulder 31 formed in the ring 9 above the air inlet passage 15. As shown, the venturi shield 31 is shaped as at 32 to direct liquid flow inwardly toward the center of the device.

A spray-controlling device which may be made as a single unitary member or may be made in separate parts and joined together comprises an inner and an outer part. As shown, the inner part is a skirt-like member 33 with an inwardly directed upper portion 34. A number of grooves or passages 35 is formed in the outer surface of the member 33. As shown at 36, the skirt-like portion is shaped to provide a downwardly directed thickening or surface forming member at the bottom of each of the grooves 35. The final outlet portion of each groove 35 is indicated at 37.

The outer portion of the spray-controlling device which, as has been said, may be integral with the portion 33 is a skirt-like member 38 having a handle enlargement 39 downwardly projecting from its outer surface. The inner surface of the portion 38 fits against the O-ring 17 with a friction fit so that the spray-controlling device or assembly will stay in position of adjustment. Its uppermost position is determined by the location of the shoulder 18. Its lowermost position of adjustment is determined by the contact of the inwardly directed portion 34 with the upper surface of the enlargement 25 of the central plug 21.

The use and operation of this device are as follows:

Of whatever material the device may be, it will be associated in use with a source of liquid such as water. As some times it is desirable to have the water discharged in a relatively solid stream or jet, at others it is desirable to have the water discharged in a broken stream or spray, and at all times it is desired to have the water as it is discharged, aerated and filled with bubbles to avoid splash and to provide better wetting qualities. The device is, therefore, arranged so that water will discharge either entirely as a spray, entirely as a solid stream, or as a combination of the two.

In FIGURE 1 the spray controlling device is arranged in the position for solid discharge. It is raised to the maximum position so that the upper end or surface of the member 38 is in contact with the shoulder 18. The degree of friction present as a result of the O-ring 17 is such as to hold the spray control assembly in the upper position.

In that position, the upper edge of the portion 34 is in contact with the inwardly directed flange 20 and all of the water passing through the device moves toward its center and about the plug 21. The water is then diverted by the portion 25 and finally discharged through the two screens 27 and 28 to emerge through the main outlet opening 40 in a relatively solid stream. This stream will be aerated, however, because in this position of adjustment as well as in others air enters through the passage 13 and moves thence through the passages 15 into the space between the flange 20 and the lower surface of the venturi shield 30. It then reaches the center of the device and comes in contact with the stream of liquid descending about the plug 21 and the air thus discharged to the center of the device is merged with the water and leaves with the water causing it to be aerated throughout.

When it is desired to have the water emerge in spray form, the adjusting device is moved downwardly to the position of FIGURE 3. In that position, the member 34 contacts the upper surface of the plug enlargement 25 and prevents the flow of liquid below the member 25 and hence shuts off the flow of liquid through the central discharge opening 40. Water is diverted to pass downwardly through the grooves 35 and to emerge finally through the openings 37 in a series of relatively small spray-like groupings of discharges. When the adjustment is that shown in FIGURE 3, the air enters through the same path as that which it follows in the other position of adjustment and the water is aerated to the same degree. All of the water is discharged in the space and from the openings 37 and it is fully aerated during this discharge.

Obviously the device might occupy an intermediate position of adjustment in which some liquid is discharged from the opening 40 and some from the openings 37. While this would not normally be a preferred position of adjustment, it is a perfectly possible one and since in no position of adjustment is the air inlet passage cut off, it is clear that at all positions of adjustment there is a supply of aerating air to the column of water as it moves through the device.

The path of air is indicated in solid arrows in FIGURES 2 and 3 and the path of water is indicated in broken arrows in the same figures.

The openings 37 may be arranged to have different angles of outward divergence. Thus the full line showing at 36 lies at one angle; the dotted line showing at 36a and the dotted line showing at 36b are at different angles of outward divergence. It is convenient to provide these different angles intermediately so that, in effect, counting around the showing of FIGURE 4, there will first be an opening with the angle 36, then one with the angle 36a, and then one with the angle 36b; this will be repeated throughout the circumference of the device. The result of this angular diversion is to cause the spray issuing from the opening 37 to have different angles of direction and if three angular arrangements are embodied, as shown in FIGURES 2 and 3, the result will be that there will be, in effect, three differently directed rings of jets or sprays, one within the other, and this arrangement produces an over all "soft" jet effect by spreading or diversifying the individual sprays.

As shown in FIGURES 5, 6 and 7, three different ball joint arrangements appear. The invention is not limited to any particular type of ball joint, nor to the use of any ball joint.

As shown in FIGURES 5 and 6, the ball is the same as that shown in FIGURE 2. In each case it is engaged in a member which is secured to the spout 1.

As shown in FIGURE 5, a part 41 is brazed or otherwise secured to the spout 1. It is provided with a threaded extension 42 which engages a nut 43 positioned about the ball 6. A collar 44 is engaged by the nut and an O-ring 45 is positioned between the collar 44 and the threaded extension 42.

In the form shown in FIGURE 6, a member 46 is brazed or otherwise secured to the spout 1. An O-ring is retained in a groove 48 within the member 46 and because of its size and shape, it retains the ball 6 in the position shown in FIGURE 6.

As shown in FIGURE 7, a modified ball is arranged. A member 49 is secured to the spout 1 by any desired means. It includes a circular water passage member 50, externally threaded at 51, and receiving a correspondingly threaded ball 52 which is perforated for the passage of water. The spray housing member 53, which corresponds to the part 12 of the earlier figures, is provided with an extension 54 which receives the ball 52. Extension 54 is grooved at 55 to receive an O-ring 56. The member 54 is also shaped internally to embrace the ball 52.

In all forms of the ball joint, it is possible to accomplish swinging or rotating movement, although that movement is indicated only in FIGURE 6 in dotted lines.

The invention is in no way limited to the presence of a ball connection.

Whereas the preferred form of the invention has been shown and described, it should be realized that there are many modifications, substitutions and alterations thereto within the scope of the following claims.

We claim:

1. In combination in a spray aerator, means defining an inner path for the discharge of liquid and means defining a plurality of peripherally arranged paths, means within said device for directing fluid selectively to said inner path or to said peripheral discharges, housing means positioned about said discharges and provided with air inlet passages in communication with said discharge passages, and a member overlying said air inlet passages and spaced from said housing means.

2. In combination in a spray aerator, means defining an inner path for the discharge of liquid and means defining a plurality of peripherally arranged paths, means within said device for directing fluid selectively to said inner path or to said peripheral discharges, housing means positioned about said discharges and provided with air inlet passages in communication with said discharge passages, and a member overlying said air inlet passages and spaced from said housing means and thus providing an annular air inlet groove.

3. In combination in a spray aerator, means defining an inner path for the discharge of liquid and means defining a plurality of peripherally arranged paths, means within said device for directing fluid selectively to said inner path or to said peripheral discharges, housing means positioned about said discharges and provided with air inlet passages in communication with each of said discharge passages, and a member overlying said air inlet passages and spaced from said housing means.

4. In combination in a spray aerator, means defining an inner path for the discharge of liquid and means defining a plurality of peripherally arranged paths, means within said device for directing fluid selectively to said inner path or to said peripheral discharges, housing means positioned about said discharges and provided with air inlet passages in communication with each of said discharge passages, and a member overlying said air inlet passages and spaced from said housing means and thus providing an annular air inlet groove.

5. In combination in a spray aerator, means defining an inner path for the discharge of liquid and means defining a plurality of peripherally arranged outwardly diverging paths, movable means within said device for directing fluid selectively to said inner path or to said peripheral discharges, housing means positioned about said discharges and provided with air inlet passages in communications with said discharge passages, and a member overlying said air inlet passages and spaced from said housing means.

6. In combination in a spray aerator, means defining an inner path for the discharge of liquid and means defining a plurality of peripherally arranged outwardly diverging paths, movable means within said device for directing fluid selectively to said inner path or to said peripheral discharges, housing means positioned about said discharges and provided with air inlet passages in communciation with each of said discharge passages, and a member overlying said inlet passages and spaced from said housing means and thus providing an annular air inlet groove.

7. In combination in a spray aerator, housing means defining an axially aligned path of water, a plurality of air inlets extending into said housing, a masking member positioned over said air inlets and defining with said housing an air inlet, said housing shaped to provide an outwardly flared wall member, means supporting a central baffle member within said housing, a water guiding member including a generally cylindrical part formed to provide a plurality of water passages, and a water guiding portion positioned to contact said baffle and when contacting said baffle eqective to direct water to the water passages and adapted also to contact said housing and when so contacting to direct water through said axial passage and toward said baffle.

8. In combination in a spray aerator, housing means defining an axially aligned path of water, a plurality of air inlets extending into said housing, a masking member positioned over said air inlets and defining with said housing an air inlet, said housing shaped to provide an outwardly flared wall member, means supporting a central baffle member within said housing, a water guiding member including a generally cylindrical part formed to provide a plurality of water passages each outwardly directed, and a water guiding portion positioned to contact said baffle and when so contacting said baffle effective to direct water to the water passages and adapted also to contact said housing and when so contacting to direct water through said axial passage and toward said baffle.

9. In combination in a spray aerator, housing means defining an axially aligned path of water, a plurality of air inlets extending into said housing, a masking member positioned over said air inlets and defining with said housing an air inlet, said housing shaped to provide an outwardly flared wall member, means supporting a central baffle member within said housing, a water guiding member including a generally cylindrical part formed to provide a plurality of water passages each outwardly directed, said passages being arranged at three different angles of outward divergence, and a water guiding portion positioned to contact said baffle and when so contacting said baffle effective to direct water to the water passages and adapted also to contact said housing and when so contacting to direct water through said axial passage and toward said baffle.

10. In combination in a spray aerator, housing means defining an axially aligned path of water, a plurality of air inlets extending into said housing, a masking member positioned over said air inlets and defining with said housing a continuous air inlet, said housing shaped to provide an outwardly flared wall member, means supporting a central baffle member within said housing, a water guiding member including a generally cylindrical part formed to provide a plurality of water passages, and a water guiding portion positioned to contact said baffle and when so contacting said baffle effective to direct water to the water passages and adapted also to contact said housing and when so contacting to direct water through said axial passages and toward said baffle.

11. In combination in a spray aerator, housing means defining an axially aligned path of water, a plurality of air inlets extending into said housing, a masking member positioned over said air inlets and defining with said housing an annular continuous air inlet, said housing shaped to provide an outwardly flared wall member, and means supporting a central baffle member within said housing, a water guiding member including a generally cylindrical part formed to provide a plurality of water passages, and a water guiding portion positioned to contact said baffle and when so contacting said baffle effective to direct water to the water passages and adapted also to contact said housing and when so contacting to direct water through said axial passages and toward said baffle.

12. In combination in a spray aerator, housing means defining an axially aligned path of water, a plurality of air inlets extending into said housing, a masking member positioned over said air inlets and defining with said housing an air inlet, said housing shaped to provide an outwardly flared wall member within itself, and means supporting a central baffle member within said housing, a water guiding member including a generally cylindrical part formed to provide a plurality of water passages each outwardly directed, and a water guiding portion positioned to contact said baffle and when so contacting said baffle effective to direct water to the water passages and adapted also to contact said housing and when so contacting to direct water through said axial passage and toward said baffle.

13. In combination in a spray aerator, housing means defining an axially aligned path of water, a plurality of radial air inlets extending into said housing, a masking member positioned over said air inlets and defining with said housing an annular continuous air inlet, said housing shaped to provide an outwardly flared wall member within itself, and means supporting a central baffle member within said housing, a water guiding member including a generally cylindrical part formed to provide a plurality of water passages each outwardly directed, said passages being arranged at three different angles of outward divergence, and a water guiding portion positioned to contact said baffle and when so contacting said baffle effective to direct water to the water passages and adapted also to contact said housing and when so contacting to direct water through said axial passage and toward said baffle.

14. In combination in a spray aerating device, water housing means comprising a generally cylindrical member having an inwardly directed flange and an outwardly flared skirt portion, a plurality of air passages formed through said housing member and a downwardly depending baffle secured to said housing member overlying said air passages and spaced from said housing member to provide an annular air inlet, a perforated water guiding disk positioned within said housing, a baffle member secured to said disk and comprising a generally cylindrical part with an outwardly flared portion, a venturi shield positioned between said disk and said inwardly directed flange and spaced from said flange, said air inlets communicating with the space between said flange and said shield, and a water guiding member comprising means defining a plurality of peripherally arranged passages, the terminal end of each passage having an outwardly directed surface, said guiding means provided with an inwardly directed skirt portion adapted in one position of adjustment to contact and to be limited by said flange and in another position of adjustment to be contacted and limited by said flared portion.

15. In combination in a spray aerating device, a housing water passage therethrough, a water guiding passage member shaped to define a plurality of different passages therethrough, said passages being in communication with the first mentioned passage, one of said water passages located in axial alignment with said housing, other water passages arranged in an annular pattern about the periphery of said guiding member, and means in said other passages for directing streams of water outwardly as they emerge from said other passages, and a skirt member depending from said housing and partially overlying said water guiding members and defining an air passage extending upstream, and a plurality of individual air passages radially arranged and extending toward the inner portion of the water guiding member, a water path adjacent said member comprising a sleevelike part, an external handle portion thereon and an inwardly directed skirt, said skirt being effective in one position of adjustment to guide water peripherally and in another position of adjustment to guide water generally centrally, and friction means for retaining said last mentioned member in any position of adjustment within its extreme limits of adjustment.

References Cited by the Examiner

UNITED STATES PATENTS

| 2,935,265 | 5/1960 | Richter | 239—428.5 |
| 2,989,249 | 6/1961 | Richter | 239—428.5 |
| 2,990,122 | 6/1961 | Blumberg et al. | 239—428.5 |

FOREIGN PATENTS 374,341   2/1964   Switzerland.

EVERETT W. KIRBY, *Primary Examiner.*